Figure 1:
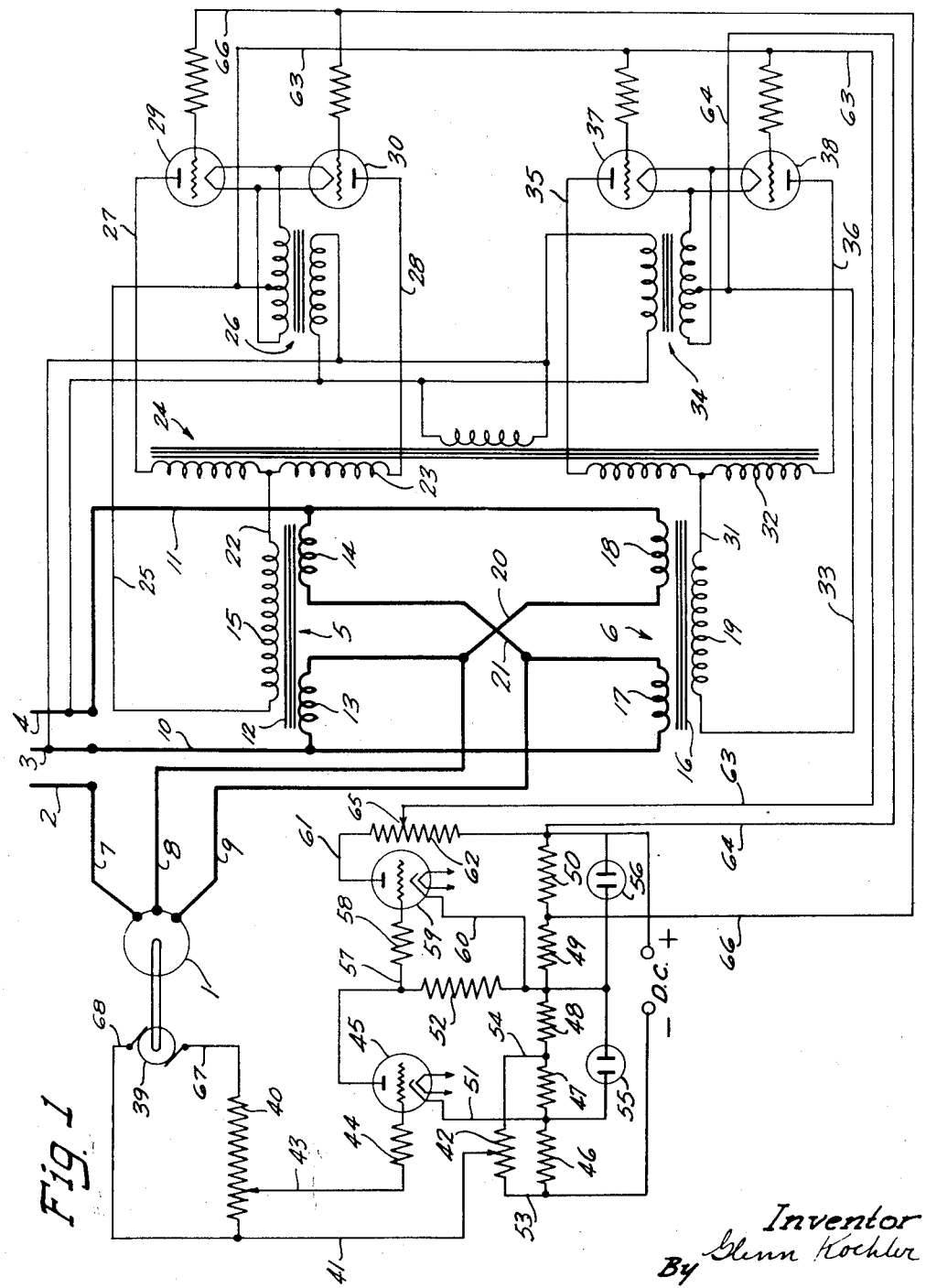

July 17, 1951

G. KOEHLER 2,560,698

INDUCTION MOTOR SPEED CONTROL

Filed Oct. 17, 1946

2 Sheets-Sheet 1

Inventor
Glenn Koehler
By
David G. Fix
Attorney

July 17, 1951  G. KOEHLER  2,560,698
INDUCTION MOTOR SPEED CONTROL
Filed Oct. 17, 1946  2 Sheets-Sheet 2
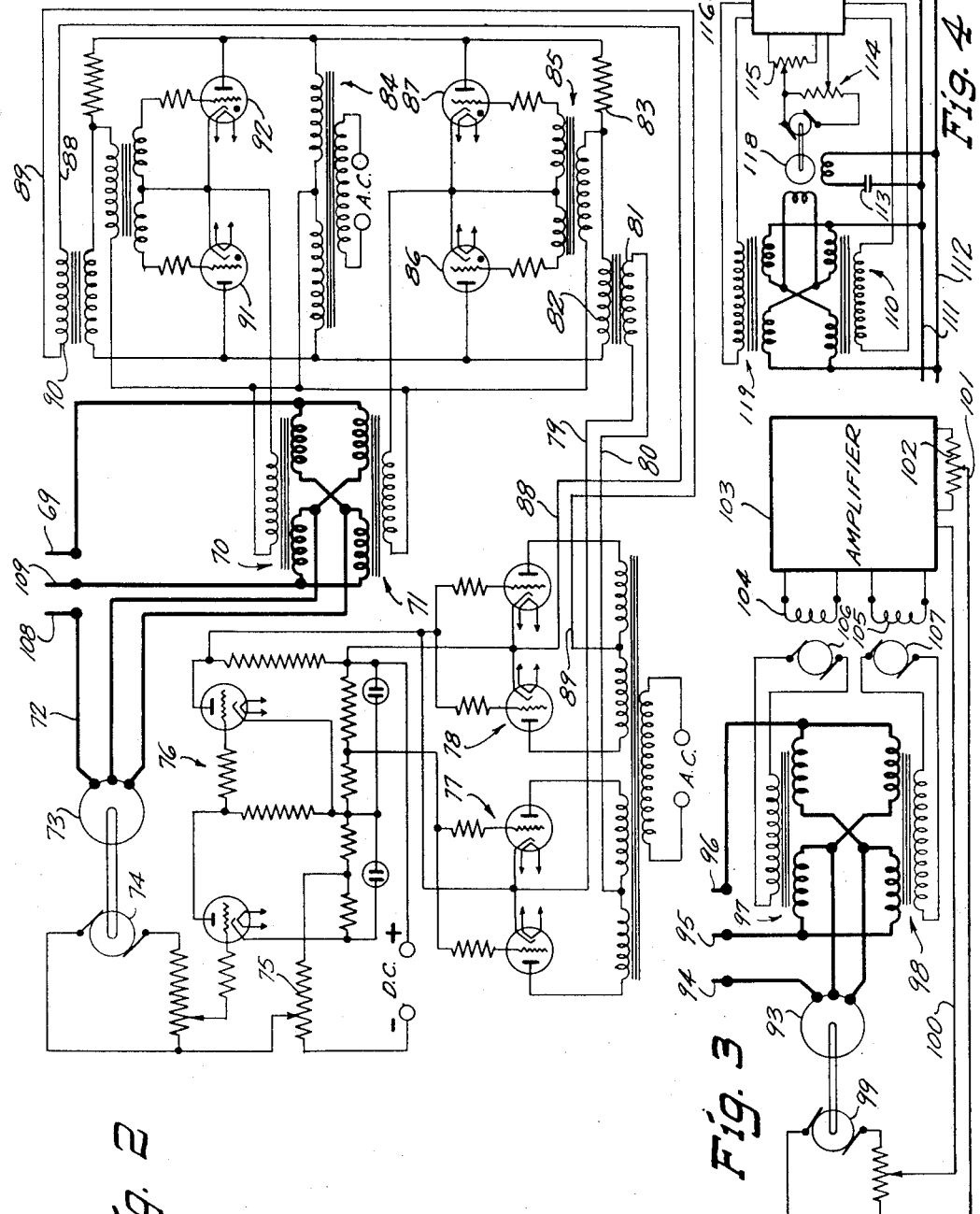
Inventor
Glenn Koehler
By David A. Fox
Attorney Patented July 17, 1951

2,560,698

UNITED STATES PATENT OFFICE 2,560,698

INDUCTION MOTOR SPEED CONTROL

Glenn Koehler, Madison, Wis.

Application October 17, 1946, Serial No. 703,762

6 Claims. (Cl. 318—202)

1

This invention relates to control circuits for controlling and regulating the speed and direction of rotation of alternating current induction motors and it resides more specifically in a control apparatus comprising saturation reactors so interposed as to be capable of inverting the phase sequence of power delivered to the motor to any degree desired, from a complete forward to a complete reverse sequence, through concomitant diminution and augmentation of excitation of the saturation windings of the reactors, such diminution and augmentation of excitation being rendered differentially responsive to the rate of rotation of the motor through pilot potential amplifying means furnishing excitation to the reactors so as to tend to regulate the motor's running speed in the face of load fluctuations and being subject to manual adjustment for selection of the desired rate and direction or rotation of the motor.

An object of this invention is to provide a motor speed control system for alternating current induction motors such that an operator may call for any speed of the motor desired from full forward rotation through zero to full reverse rotation and in which the motor will assume and maintain the speed called for by the operator within comparatively close limits regardless of variations of load imposed as long as such load is within the capabilities of the motor under control.

Another object is to provide a control for an alternating current motor which when connected with an overhauling load automatically will be caused to exert whatever counter-torque may be required for the purpose of regulating any reverse speed of rotation called for by the operator without requiring the operator to forsee and make adjustments to meet the amount of overhauling load which may be imposed. The above and further objects and advantages of this invention will appear from the description following.

This invention is herein described by reference to the accompanying drawing forming a part hereof and in which there is set forth by way of illustration and not of limitation specific forms in which the invention may be embodied.

In the drawings:

Fig. 1 is a diagram of one form of the circuit of the apparatus of this invention, Fig. 2 is a diagram of another form of the circuit of the apparatus of this invention adapted for control of motors of larger size, Fig. 3 is a simplified diagram of another form of the circuit of the apparatus of this invention adapted for the control of motors of still larger size, and Fig. 4 is a simplified diagram of the application of the circuit of the apparatus of this invention applied to the regulation of a single phase capacitor motor.

2

In the form of the control apparatus of this invention shown in Fig. 1 a three-phase induction motor 1 is shown connected to power mains 2, 3 and 4 through a pair of saturation reactors 5 and 6. The connection of the motor 1 above referred to is made by lead 7 joining directly with power main 2, by leads 8 and 9 connected to saturation reactors 5 and 6 and by leads 10 and 11 which join the saturation reactors 5 and 6 with power mains 3 and 4.

Saturation reactor 5 is made up of a core 12 forming a flux path threading impedance windings 13 and 14 located to be magnetized to the point of saturation by a saturation winding 15. In like manner saturation reactor 6 is made up of a core 16 similarly related to impedance windings 17 and 18 and saturation winding 19.

Impedance windings 13 and 18 are electrically joined by a cross-over connection 20 as shown while impedance windings 14 and 17 are similarly joined by a cross-over connection 21. The opposite ends of windings 13 and 17 are connected to lead 10 joined with power main 3. The opposite ends of windings 14 and 18 are connected in similar fashion with lead 11 and thus connected with power main 4. Motor leads 8 and 9 are connected as shown respectively with cross-over connections 20 and 21.

By reason of this arrangement when 3-phase alternating current is applied to the mains 2, 3 and 4 the phase sequence thereof which becomes applied to the motor 1 will be dependent upon the condition of saturation of saturation reactors 5 and 6. For example, if reactor 5 be completely unsaturated and reactor 6 completely saturated the path from main 3 to motor 1 will follow through lead 10, winding 17 and lead 9 to motor 1. The path through windings 13 and 14 will be substantially closed by reason of the high impedance thereof when core 12 is not saturated. In corresponding fashion the path from main 4 to motor 1 will be through lead 11, winding 18, cross-over connection 20 and lead 8. Windings 17 and 18 thus offer substantially unobstructed paths for passage of current by reason of the saturated condition of core 16.

If it is desired to invert the phase sequence applied to motor 1 winding 15 may be excited while winding 19 is left free of excitation. In this event power from main 3 will pass through lead 10, winding 13 and lead 8 to motor 1 while power from main 4 will pass through lead 11, winding 14, cross-over connection 21 and lead 9.

The direction of rotation of motor 1, assuming the same is an induction motor of either the squirrel cage or wound rotor type, thus may be determined by electing to excite either winding 15 or winding 19. Also if desired, partial displacement without actual inversion of the phase sequence applied to motor 1 may be induced by simultaneously exciting windings 15 and 19 to varying degrees. For example, if both are excited to the same degree, resultant currents are set up in motor leads 8 and 9 which are approximately 180 degrees out of phase with current in motor lead 7, in effect applying to motor 1 substantially single phase excitation. On the other hand, if winding 15 be excited to a degree preponderating with respect to the excitation of winding 19 but with some substantial excitation still remaining in winding 19, a forward phase sequence will be applied to motor 1 intermediate between full forward phase sequence and the ambiguous single phase excitation which occurs when windings 15 and 19 are equally excited. If the excitation of windings 15 and 19 be arranged to be concomitantly diminished and augmented, then power may be applied from the mains 2, 3 and 4 to the motor 1 to produce any degree of forward or reverse field rotation which may be desired and in this manner any degree of forward or reverse torque or driving speed may be produced. It should be understood that in so regulating the speed of motor 1 phase unbalance is induced at all speeds except full forward and reverse speeds and even under full forward and reverse speeds some unbalance will still remain because of potential drops through the windings 13, 14, 17 and 18.

As shown in Fig. 1 winding 15 is connected by lead 22 with the midpoint tap of a secondary winding 23 of a transformer 24 and by lead 25 with the midpoint tap of the secondary winding of filament supply transformer 26. The ends of the transformer winding 23 are connected by leads 27 and 28 with plates of grid control rectifier vacuum tubes 29 and 30. By reason of this arrangement the quantity of current supplied to the winding 15 of saturation reactor 5 is dependent upon the potential prevailing in the grids in tubes 29 and 30.

In similar fashion winding 19 of saturation reactor 6 is connected by a lead 31 with the midpoint of the secondary winding 32 of transformer 24 and by a lead 33 with the midpoint of the secondary winding of transformer 34. The opposite ends of winding 32 are connected respectively by means of leads 35 and 36 with the plates of grid controlled vacuum rectifying tubes 37 and 38. Here again the quantity of current flowing in winding 19 of saturation reactor 6 is dependent upon potential prevailing in the grids of tubes 37 and 38.

For the purpose of regulating the grid potentials in tubes 29 and 30 and in tubes 37 and 38 circuit means differentially responsive to speed of motor 1 are provided. As shown in Fig. 1 a generator 39 is permanently connected to the shaft of motor 1 to be driven in unison with it and is connected as shown to produce a potential drop across a potentiometer resistor 40 which is a function of the running speed of motor 1. The generator 39 is preferably a separately excited generator or one furnished with a permanent magnet field so that the polarity thereof reverses upon reversal of rotation of motor 1. The generator 39 is a pilot device depended upon simply to produce a potential difference which is a function of the running speed of motor 1 and, therefore, may be very small and may impose an insignificant load upon the motor 1.

One end of resistor 40 is connected by means of a lead 41 with a movable center point contact of a potentiometer resistor 42. The center tap terminal of resistor 40 is connected by means of lead 43 through a resistor 44 with the grid of a vacuum amplifying tube 45. For the purpose of furnishing plate current to the tube 45 a direct current supply of appropriate voltage is applied across a voltage divider resistor composed of the segments 46, 47, 48, 49 and 50, and the cathode lead 51 and the plate load resistor 52 of the tube 45 are connected to subtend the segments 47 and 48.

The potentiometer resistor 42 heretofore referred to is connected by a lead 53 with the negative end of resistor segment 46 and by a lead 54 with the positive end of segment 47. For the purpose of stabilizing voltages in the voltage divider glow discharge tubes 55 and 56 are connected respectively across resistor segments 47, 48 and 49, 50.

The amount of current flowing in and the potential drop across load resistor 52 is determined by potential prevailing in the grid of tube 45. This potential drop is applied through lead 57 and grid resistor 58 to the grid of vacuum amplifying tube 59, the cathode of which is connected by a lead 60 as shown. Plate current for operation of the tube 59 is provided by the potential drop occurring across resistor segments 49 and 50 by reason of connection of plate lead 61 through load resistor 62 with the positive end of resistor segment 50. The load current flowing in and the potential drop occurring across load resistor 62 thus is differentially responsive to current flowing in the plate circuit of tube 45.

With motor 1 standing still and with the output of generator 39 at zero the charge on the grid of tube 45 may be varied from a charge which is slightly positive with reference to the cathode by moving the center tap of potentiometer 42 to the extreme right, to a charge which is sufficiently negative with respect to the cathode of tube 45 to produce cut-off by moving the center tap of potentiometer 42 to the extreme left.

The differential response of tube 59 to the tube 45 thus produces a potential drop in the load resistor 62 when the center tap of potentiometer 42 is to the left with the motor 1 standing at rest. This potential drop in load resistor 62 is applied through leads 63 and 64 to the cathodes and grids of tubes 37 and 38, thus cutting off current flow in winding 19 of saturation reactor 6. Under this same condition the potential drop between the movable contact 65 at the point where lead 63 engages the resistor 62 and the left hand end of resistor segment 50 which is engaged by lead 66 will be small by reason of the opposed character of the potential drops in the resistors 62 and 50. This reduced potential is applied through leads 63 and 66, respectively, to the cathodes and grids of tubes 29 and 30 causing the same to become conducting and to supply current to the saturation winding 15 of saturation reactor 5. In this way power is admitted from the mains 2, 3 and 4 to the motor leads 7, 8 and 9 in forward phase sequence and motor 1 will start and run in the forward direction.

If the center tap terminal of potentiometer 42 be moved to the extreme right, tube 45 will become conducting and a cut-off potential become applied to the grid of tube 59. Under these circumstances the potential drop in resistor 62 becomes small thus causing tubes 37 and 38 to become conducting so that current will be admitted to the winding 19 of reactor 6. At the same time the absence of a potential drop in resistor 62 sufficient to oppose the drop in resistor 50 results in a substantial negative charge being applied to the grids of tubes 29 and 30 thus causing these tubes to become non-conducting preventing current flow in saturation winding 15 of saturation reactor 5. In this way the phase sequence applied to motor 1 is inverted and the motor 1 under such conditions will start and run in reverse direction.

For various intermediate positions between the extreme right and left hand ends of potentiometer resistor 42 to which the center tap may be adjusted there will be various intermediate stages of concomitant diminution and augmentation of the current flowing in saturation windings 15 and 19 with the result that phase displacements intermediate between the two extremes of complete inversion may be applied to motor 1. By reason of this under any given load condition the speed of motor 1 may be varied from full forward speed to full reverse speed by simple shifting of the center tap terminal of the potentiometer 42. For convenience in causing the zero speed or phase transition point to fall at or near the center of the potentiometer 42 the movable contact 65 may be adjusted with respect to the resistor 62.

In order to render the running speed of motor 1 reasonably constant in spite of fluctuating load conditions generator 39 is provided with a polarity such that when motor 1 is running in the forward direction terminal 67 thereof becomes increasingly positive as speed increases while terminal 68 becomes increasingly negative as speed increases. In this way an opposing potential becomes interposed in the grid circuit of tube 45 tending to displace the phase sequence favorably to forward running of the motor 1. It is intended, of course, that potentiometer 42 when adjusted to the extreme left will be capable of overcoming completely the opposing potential originating from generator 39 even when motor 1 is running at maximum forward speed. However, in positions of potentiometer 42 calling for reduced running speed of the motor opposing potentials originating in generator 39 become of significance to such an extent that if the motor under any given load condition shall increase its speed, phase sequence will immediately shift to reduce torque exerted by it while on the other hand if load conditions are such as to cause motor 1 to slow down, phase conditions will immediately shift so as to increase the torque exerted by the motor. In this way very good regulation of speed in spite of fluctuating loads is produced throughout the range of operating capabilities of motor 1.

In like manner if the center tap of potentiometer 42 be positioned to the right of the phase inversion point so as to call for reverse running of the motor and the motor 1 shall have been reversed in its running, then the polarity of the output of generator 39 likewise will reverse and terminal 67 thereof will become negative. The potential drop in resistor 40 operating in the grid circuit of tube 45 thus will oppose that derived from potentiometer 42. In this way regulation of the speed of motor 1 in spite of load fluctuation occurs in reverse running the same as in the case of forward running.

Of particular value in cases where motor 1 is employed for the handling of overhauling loads is the property of the apparatus of this invention of not only increasing and decreasing the torque of the motor to meet fluctuating load conditions but also the property of being able to actually reverse the torque of the motor for the purpose of better maintaining regulation. For example, if during lowering of the load by a hoist the operator chooses a low speed reverse driving position near the center of the potentiometer resistor 42 the motor 1 will immediately upon admission of power exert such torque as may be needed to overcome static friction and to accelerate itself and its load to the chosen lowering speed. If this speed be slightly exceeded, then generator 39 operating upon the grid of tube 45 will reduce the current flowing therein thus causing reactor 6 to become less saturated and reactor 5 to become more saturated and this process will carry first to the point where zero torque phase sequence is applied to motor 1. If under impetus of the load the motor 1 tends to further accelerate, the grid of tube 45 will become still more negative thus causing the phase sequence delivered through saturation reactor 5 to actually predominate over that delivered through saturation reactor 6 thus causing motor 1 to exert counter-torque sufficient to produce a braking action which will maintain the downward speed of the load within close limits not greatly varying from the downward speed of an empty hook with the potentiometer 42 adjusted to the same position.

The promptness with which the control circuit of this invention responds to accommodate to varying load conditions is such as to very largely overcome any tendency to overrun. By reason of this slow speed inching of a load either upwardly or downwardly in hoists so equipped may be accomplished with great ease and facility by an operator without any special skill. The entire control is regulated by means of the potentiometer 42 which is a very light and simple element well adapted to be rendered portable by placing it at the end of a drop cord and the like. Furthermore, since it is potential differences rather than currents that are important in the functioning of potentiometer 42 very light leads may be employed and the length of the same is a matter of strict indifference. In the functioning of the apparatus it will, therefore, be evident that the tubes 45, 59, 29, 30, 37 and 38 and their associated circuit elements constitute an amplifying system which operates differentially with respect to the speed of motor 1 to regulate the torque of the motor 1 both in forward and reverse running directions.

In cases where motors of larger size are to be controlled it may be difficult to provide vacuum tubes such as 29, 30, 37 and 38 of sufficient capacity to furnish excitation current for the larger saturation reactors which would be required. In such cases it may be more advantageous to employ the circuit appearing in Fig. 2 in which case an additional stage of amplification employing a set of Thyratron tubes is employed to deliver the excitation current to the saturation reactors.

In this form of the circuit of this invention entrance mains 108, 109 and 69 are arranged to be connected through cross connected saturation reactors 70 and 71 and through lead 72 with the terminals of motor 73. Motor 73 is drivingly connected with a generator 74 the output of which is joined with a main control potentiometer 75 and an initial differentially responsive two-stage amplifier generally designated 76. The initial amplifier 76 is in all respects similar to that made up of the tubes 45 and 59 and associated circuit elements described above in connection with Fig. 1.

The output of the initial differential amplifier 76 is connected as shown to the intermediate forward and reverse amplifier stages generally designated 77 and 78. The output of intermediate amplifier stage 77 is connected by leads 79 and 80 with a saturation winding 81 arranged to upset the balance of an impedance-resistance bridge made up of impedance winding 82 and resistance 83. This impedance-resistance bridge is connected to be supplied with alternating current from the center tap transformer 84 which impresses upon grid control transformer 85 coincident or opposed phase relationship dependent upon the degree of excitation of winding 81. Thyratron tubes 86 and 87 thus deliver to the excitation winding of saturation reactor 71 current proportional to but largely in excess of current prevailing in winding 18.

In similar manner intermediate amplifier 78 is connected by leads 88 and 89 with saturation winding 90 arranged to control the firing of Thyratron tubes 91 and 92 in a manner analogous to the control of the firing of the tubes 86 and 87 by the winding 81. Current passed by the Thyratrons 91 and 92 is delivered to the saturation winding of the saturation reactor 78 in proportion to current prevailing in the winding 90.

In functioning the circuit shown in Fig. 2 exhibits the same properties as those described in connection with the circuit shown in Fig. 1.

For the control of motors of still larger size a system such as is diagrammatically shown in Fig. 3 may be resorted to. In this arrangement a motor 93 is connected as shown to be supplied with current from mains 94, 95 and 96 by connection through saturation reactors 97 and 98. A pilot generator 99 is arranged to be driven by the motor 93 and its output is connected through leads 100, 101 and main control potentiometer 102 with an amplifier 103 similar to that shown either in Fig. 1 or Fig. 2.

The output of amplifier 103, differentially responsive to the speed of motor 93, is applied to generator field windings 104 and 105 operating to control the current delivered by armatures 106 and 107. Armature 106 is connected to deliver its output to the saturation winding of saturation reactor 97 while armature 107 is connected to deliver its output to the saturation winding of saturation reactor 98. In this arrangement the characteristics described above in connection with the circuits shown in Figs. 1 and 2 are exhibited by the circuit shown in Fig. 3. Complete control of forward and reverse driving of motor 93 is obtained by simply shifting the center tap of control potentiometer 102.

As shown in Fig. 4 a single phase motor 118 may be similarly controlled by saturation reactors 119 and 110 the latter being connected as shown to power supply mains 111 and 112. The motor 118 is provided with stator windings one of which is connected through phase displacement means 113 with the lines 111 and 112. As in the case of the other circuits above described a pilot potential source 114 is connected to be driven by the motor 118 and its output is applied through the potentiometer 115 to an amplifier 116. The amplifier in turn furnishes excitation to the saturation reactors 119 and 110 in the manner already described.

I claim:

1. In an apparatus adapted to control the speed and direction of rotation of an alternating current induction motor the combination comprising saturation controlled variable reactor means adapted to be interposed in the entrance mains of a motor to be controlled and having forward excitation windings adapted when excited to cause admission of current to said motor with a forward phase sequence, and reverse excitation windings adapted when excited to cause admission of current to said motor with reverse phase sequence, said forward and reverse excitation windings being adapted when intermediately excited concomitantly to impose displaced phase sequences on said motor intermediate between forward and reverse phase sequence; pilot potential generating means responsive to the rate of rotation of said motor to be controlled; adjustable biasing means adapted to impose a predetermined bias potential upon the potential output of said pilot generating means; amplifying means connected to said pilot potential generating means and to said adjustable biasing means adapted to amplify changes in the resultant thereof; and regulatable excitation current sources for said reactor excitation windings connected to the output of said amplifying means to be regulated thereby one of said excitation windings to be varied in proportion to changes in said amplified resultant bias the other to be varied in inverse proportion to said amplified resultant bias so as to concomitantly augment and diminish the excitation currents in said excitation windings in response to the speed and direction of rotation of said motor and the position of adjustment of said adjustable biasing means.

2. In an apparatus adapted to control the speed and direction of rotation of an alternating current induction motor the combination comprising saturation controlled variable reactor means adapted to be interposed in the entrance mains of a motor to be controlled and having forward excitation windings adapted when excited to cause admission of current to said motor with a forward phase sequence, and reverse excitation windings adapted when excited to cause admission of current to said motor with reverse phase sequence, said forward and reverse excitation winding being adapted when intermediately excited concomitantly to impose displaced phase sequences on said motor intermediate between forward and reverse phase sequence; a pilot generator adapted to be connected to said motor to be driven thereby having a potential output the polarity of which is determined by the sense of rotation of said motor and the intensity of which is proportional to the running speed of said motor; a manually adjustable bias potential source connected to and adapted to impose a selected bias on the output of said pilot generator to produce a resultant bias; an amplifier including an output load resistor connected to said pilot generator and said manually adjustable bias source adapted to amplify changes in said resultant bias; a variable excitation current source for said forward excitation windings and said reverse excitation windings including grid controls for regulating the output thereof; circuit connections joining the output of said amplifier with the grid control of said forward excitation current source to apply the potential drop of said load resistor thereto, a fixed potential source having a magnitude approximating the maximum potential drop occurring in said load resistor in opposing circuit connection therewith, and circuit means for applying the resultant potential of the potential drop in said load resistor and said fixed potential source to the grid control of said reverse excitation current source.

3. In an apparatus adapted to control the speed and direction of rotation of a three phase alternating current induction motor the combination comprising a forward torque saturation reactor having a pair of separate forward reactance windings and an excitation winding, a reverse torque saturation reactor having a pair of separate reverse reactance windings and an excitation winding, circuit connections adapted to connect one terminal of a motor to be controlled to one member of a three phase power source, circuit connections adapted to connect one end of one forward reactance winding and one end of one reverse reactance winding to a second member of said three phase power source, circuit connections adapted to connect the opposite ends of said forward and reverse reactance windings respectively to a second and a third terminal of said motor, a circuit connection adapted to connect one end of the remaining forward and reverse reactance windings to the third member of said three phase power source, circuit connections adapted to connect the opposite ends of said remaining forward and reverse reactance windings respectively to the third and second terminals of said motor, a pilot generator adapted to be connected to said motor to be driven thereby having a potential output the polarity of which is determined by the sense of rotation of said motor and the intensity of which is proportional to the running speed of said motor, an adjustable bias potential source connected to and adapted to impose a selected bias on the output of said pilot generator to produce a resultant bias, an amplifier connected to said pilot generator and said manually adjustable bias source adapted to amplify changes in said resultant bias, a variable excitation current source for each of said excitation windings including grid controls for regulating the output thereof, circuit connections joining the output of said amplifier with the grid control of one of said excitation current sources so as to alter the output thereof in proportion to algebraic change of said resultant bias, and circuit connections joining the output of said amplifier with the grid control of the other of said excitation current sources so as to alter the output thereof in inverse proportion to algebraic change of said resultant bias.

4. In an apparatus adapted to control the speed and direction of rotation of a three phase alternating current induction motor the combination comprising a forward torque saturation reactor having a pair of separate forward reactance windings and an excitation winding, a reverse torque saturation reactor having a pair of separate reverse reactance windings and an excitation winding, circuit connections adapted to connect one terminal of a motor to be controlled to one member of a three phase power source, circuit connections adapted to connect one end of one forward reactance winding and one end of one reverse reactance winding to a second member of said three phase power source, circuit connections adapted to connect the opposite ends of said forward and reverse reactance windings respectively to a second and a third terminal of said motor, a circuit connection adapted to connect one end of the remaining forward and reverse reactance windings to the third member of said three phase power source, circuit connections adapted to connect the opposite ends of said remaining forward and reverse reactance windings respectively to the third and the second terminal of said motor, a bias potential source including a pilot generator adapted to be driven by said motor, a variable excitation current source for each of said excitation windings including grid controls for regulating the output thereof, an amplifier responsive to the bias created by said bias source including an output stage having a load resistor, circuit means for applying the potential drop in said load resistor to the grid control of said forward excitation current source, a fixed potential source having a magnitude approximating the maximum potential drop occurring in said load resistor in opposing circuit connection therewith, and circuit means for applying the resultant potential of the potential drop in said load resistor and said fixed potential source to the grid control of said reverse excitation current source.

5. In an apparatus adapted to control the speed and direction of rotation of a three phase alternating current induction motor the combination comprising a forward torque saturation reactor having a pair of separate forward reactance windings and an excitation winding, a reverse torque saturation reactor having a pair of separate reverse reactance windings and an excitation winding, circuit connections adapted to connect one terminal of a motor to be controlled to one member of a three phase power source, circuit connections adapted to connect one end of one forward reactance winding and one end of one reverse reactance winding to a second member of said three phase power source, circuit connections adapted to connect the opposite ends of said forward and reverse reactance windings respectively to a second and a third terminal of said motor, a circuit connection adapted to connect one end of the remaining forward and reverse reactance windings to the third member of said three phase power source, circuit connections adapted to connect the opposite ends of said remaining forward and reverse reactance windings respectively to the third and the second terminal of said motor, a pilot generator adapted to be driven by said motor and to produce a bias potential of polarity determined by the sense of rotation of said motor and of a magnitude determined by the rate of rotation thereof, adjustable biasing means adapted to superimpose a predetermined bias on said pilot generator output to provide a resultant bias, a variable excitation current source for each of said excitation windings including grid controls for regulating the output thereof, an amplifier responsive to said resultant bias including an output stage having a load resistor, circuit means for applying the potential drop in said load resistor to the grid control of said forward excitation current source, a fixed potential source of polarity opposite to the potential drop in said load resistor in circuit connection therewith having a magnitude approximating the maximum potential drop occurring in said load resistor, and circuit means for applying the resultant potential of the potential drop in said load resistor and said fixed potential source to the grid control of said reverse excitation current source.

6. A motor control system, comprising a multiphase alternating-current motor having terminals, a multiphase energizing circuit connected to said terminals for providing energization for said motor, a group of controllable impedance devices each having an impedance winding and a control winding, said impedance windings being connected with one another and with said circuit to form an impedance network for controlling the phase distribution of said energization in accordance with the impedance distribution in said network, two discharge tubes having respective plate circuits and respective control circuits, at least one of said control windings being connected in the plate circuit of one of said tubes, and at least one other control winding being connected in the plate circuit of said other tube so that said network is caused to vary its impedance distribution in one or the other sense depending upon a change in the ratio of effective conductance of said two tubes, said tube control circuits having biasing means tending to render both tubes conductive, circuit means disposed in said respective control circuits for applying control voltages to said tubes respectively, and control means disposed for varying said control voltages and operatively associated with both said control circuits to control their respective control voltages in inverse relation to each other so that an increasing effective conductance of either tube, caused by said control means, is accompanied by a decreasing effective conductance of the other tube.

GLENN KOEHLER.

REFERENCES CITED

The following references are of record in the file of this patent:

UNITED STATES PATENTS

| Number | Name | Date |
|---|---|---|
| 808,944 | Porter et al. | Jan. 2, 1916 |
| 1,376,453 | Meyer | May 3, 1921 |
| 1,411,862 | Meyer | Apr. 4, 1922 |
| 1,849,646 | Stoller | Mar. 15, 1932 |
| 2,228,078 | Gulliksen | Jan. 7, 1941 |
| 2,384,865 | Wickerham | Sept. 18, 1945 |
| 2,411,608 | Lesnick | Nov. 26, 1946 |
| 2,440,319 | Wickerham | Apr. 27, 1948 |

Certificate of Correction

Patent No. 2,560,698                                          July 17, 1951

GLENN KOEHLER

It is hereby certified that error appears in the printed specification of the above numbered patent requiring correction as follows:

Column 7, line 17, for "18" read *81*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*